US010958604B2

(12) United States Patent
Aist et al.

(10) Patent No.: US 10,958,604 B2
(45) Date of Patent: Mar. 23, 2021

(54) COMMUNICATION SYSTEM FOR CONDITIONAL COMMUNICATION MECHANISM AND METHOD OF OPERATION THEREOF

(71) Applicant: Telenav, Inc., Santa Clara, CA (US)

(72) Inventors: Gregory S. Aist, Santa Clara, CA (US); Aliasgar Mumtaz Husain, Milpitas, CA (US); Casey Carter, Sunnyvale, CA (US); Shalu Grover, Sunnyvale, CA (US); Naveen Kumar Vandanapu, Sunnyvale, CA (US)

(73) Assignee: Telenav, Inc., Santa Clara, CA (US)

( * ) Notice: Subject to any disclaimer, the term of this patent is extended or adjusted under 35 U.S.C. 154(b) by 25 days.

(21) Appl. No.: 15/199,253

(22) Filed: Jun. 30, 2016

(65) Prior Publication Data

US 2018/0006985 A1 Jan. 4, 2018

(51) Int. Cl.
*H04L 12/58* (2006.01)
*H04L 29/08* (2006.01)

(52) U.S. Cl.
CPC .............. *H04L 51/14* (2013.01); *H04L 67/18* (2013.01); *H04L 67/20* (2013.01); *H04L 67/24* (2013.01); *H04L 67/306* (2013.01)

(58) Field of Classification Search
None
See application file for complete search history.

(56) References Cited

U.S. PATENT DOCUMENTS

| | | | |
|---|---|---|---|
| 6,260,024 B1 * | 7/2001 | Shkedy | G06Q 10/087 705/23 |
| 8,755,824 B1 | 6/2014 | Wang et al. | |
| 8,868,254 B2 | 10/2014 | Louboutin | |
| 2007/0232274 A1 * | 10/2007 | Jung | H04M 1/72552 455/412.1 |
| 2008/0171555 A1 * | 7/2008 | Oh | G01C 21/20 455/456.1 |
| 2008/0195456 A1 * | 8/2008 | Fitzpatrick | G06Q 10/06311 705/7.15 |
| 2009/0150489 A1 * | 6/2009 | Davis | G06Q 10/107 709/204 |
| 2009/0172118 A1 * | 7/2009 | Lee | H04L 67/18 709/206 |
| 2009/0177749 A1 * | 7/2009 | McLean | G06Q 10/107 709/206 |
| 2009/0328087 A1 * | 12/2009 | Higgins | H04N 7/173 725/10 |
| 2010/0325207 A1 * | 12/2010 | Churchill | H04L 51/14 709/204 |

(Continued)

FOREIGN PATENT DOCUMENTS

WO WO 2014/1406688 A1 * 9/2014 ............ G06Q 30/06

*Primary Examiner* — Mohamed Ibraim
(74) *Attorney, Agent, or Firm* — Perspectives Law Group, Corp.

(57) ABSTRACT

A method of operating a communication system includes: receiving a conditional communication for communicating the conditional communication from a sender to a receiver; determining with a control circuit a delivery condition for communicating the conditional communication to the receiver based on the sender; and communicating the conditional communication based on the delivery condition.

15 Claims, 8 Drawing Sheets

(56) References Cited

U.S. PATENT DOCUMENTS

| | | | |
|---|---|---|---|
| 2013/0159336 A1* | 6/2013 | Minamizawa | G06F 17/30386 707/758 |
| 2014/0089417 A1* | 3/2014 | Van Os | H04L 51/00 709/206 |
| 2014/0164473 A1* | 6/2014 | Danzeisen | H04L 67/327 709/202 |
| 2016/0261542 A1* | 9/2016 | Parthasarathy | H04L 51/22 |

* cited by examiner

COMMUNICATION SYSTEM FOR CONDITIONAL COMMUNICATION MECHANISM AND METHOD OF OPERATION THEREOF

TECHNICAL FIELD

An embodiment of the present invention relates to a communication system, and more particularly to a system using conditional delivery communication.

BACKGROUND ART

Modern consumer and industrial electronics, especially devices such as communication devices, computer systems, televisions, projectors, cellular phones, portable digital assistants, and combination devices, are providing increasing levels of functionality to support modern life including communication and messaging services. Research and development in the existing technologies can take a myriad of different directions.

The increasing demand for information in modern life requires users to access information at any time, with a variety of consumer devices allowing for increased functionalities. However, the growth in functionality has also become distractions for performing desired tasks.

Thus, a need still remains for a communication system with conditional communication control. In view of the ever-increasing commercial competitive pressures, along with growing consumer expectations and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems.

Solutions to these problems have been long sought, but prior developments have not taught or suggested any solutions and, thus, solutions to these problems have long eluded those skilled in the art.

DISCLOSURE OF THE INVENTION

An embodiment of the present invention provides a method of operation of a communication system including: receiving a conditional communication for communicating the conditional communication from a sender to a receiver; determining with a control circuit delivery condition for communicating the conditional communication to the receiver based on the sender; and communicating the conditional communication based on the delivery condition.

An embodiment of the present invention provides a communication system, including: a control circuit configured to: receive a conditional communication for communicating the conditional communication from a sender to a receiver; determine a delivery condition for requiring the sender to satisfy the delivery condition in communicating the conditional communication to the receiver; communicate the conditional communication based on the delivery condition; and a storage circuit configured to store the conditional communication.

An embodiment of the present invention provides a non-transitory computer readable medium including instructions executable by a control circuit for a communication system, including: receiving a conditional communication for communicating the conditional communication from a sender to a receiver; determining a delivery condition for communicating the conditional communication to the receiver based on the sender; and communicating the conditional communication based on the delivery condition.

Certain embodiments of the invention have other steps or elements in addition to or in place of those mentioned above. The steps or elements will become apparent to those skilled in the art from a reading of the following detailed description when taken with reference to the accompanying drawings.

BEST MODE FOR CARRYING OUT THE INVENTION

Figure 1:
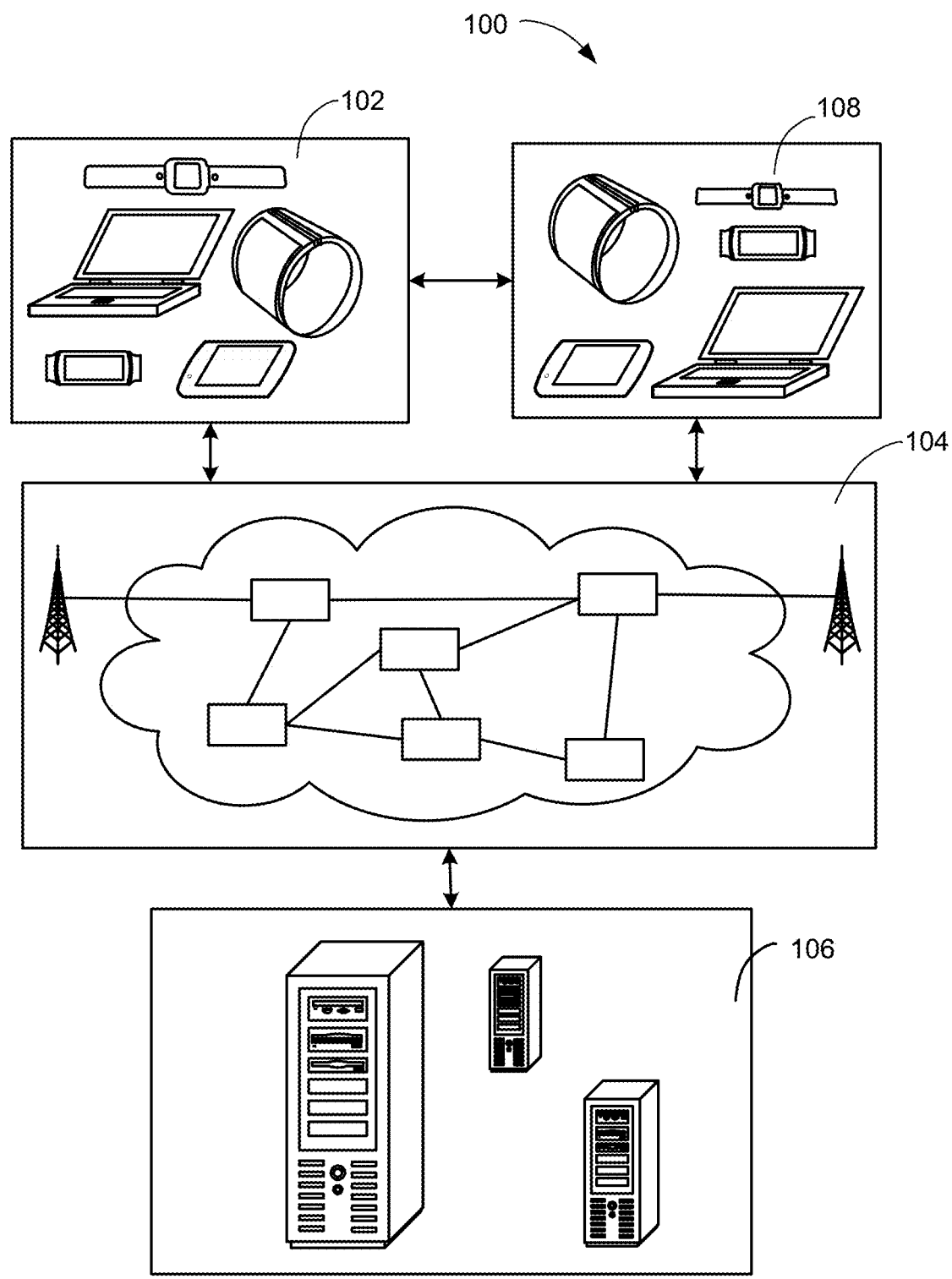
FIG. 1 is a communication system with a conditional communication mechanism in an embodiment of the present invention.

The present disclosure describes a system for sending conditional communication based on a delivery condition associated to a sender. The delivery condition can be used to delay delivery to a receiver based on sender location, external event, third party event, or combination thereof. Furthermore, the delivery condition can be determined without sender input based on content of the conditional communication.

The following embodiments are described in sufficient detail to enable those skilled in the art to make and use the invention. It is to be understood that other embodiments would be evident based on the present disclosure, and that system, process, or mechanical changes may be made without departing from the scope of an embodiment of the present invention.

In the following description, numerous specific details are given to provide a thorough understanding of the invention. However, it will be apparent that the invention may be practiced without these specific details. In order to avoid obscuring an embodiment of the present invention, some well-known circuits, system configurations, and process steps are not disclosed in detail.

The drawings showing embodiments of the system are semi-diagrammatic, and not to scale and, particularly, some of the dimensions are for the clarity of presentation and are shown exaggerated in the drawing figures. Similarly, although the views in the drawings for ease of description generally show similar orientations, this depiction in the figures is arbitrary for the most part. Generally, the invention can be operated in any orientation. The embodiments have been numbered first embodiment, second embodiment, etc. as a matter of descriptive convenience and are not intended to have any other significance or provide limitations for an embodiment of the present invention.

One skilled in the art would appreciate that the format with which navigation information is expressed is not critical to some embodiments of the invention. For example, in some embodiments, navigation information is presented in the format of (X, Y); where X and Y are two coordinates that define the geographic location, i.e., a position of a user.

In an alternative embodiment, navigation information is presented by longitude and latitude related information. In a further embodiment of the present invention, the navigation information also includes a velocity element including a speed component and a heading component.

The term "relevant information" referred to herein can include the navigation information described as well as information relating to points of interest to the user, such as local business, hours of businesses, types of businesses, advertised specials, traffic information, maps, local events, and location based community or personal information.

The term "module" referred to herein can include or be implemented as software, hardware, or a combination thereof in the present invention in accordance with the context in which the term is used. For example, the software can be machine code, firmware, embedded code, and application software. The software can also include a function, a call to a function, a code block, or a combination thereof. Also for example, the hardware can be gates, circuitry, processor, computer, integrated circuit, integrated circuit cores, a pressure sensor, an inertial sensor, a microelectromechanical system (MEMS), passive devices, physical non-transitory memory medium having instructions for performing the software function, a portion therein, or a combination thereof.

Referring now to FIG. 1, therein is shown a communication system 100 with a conditional communication mechanism in an embodiment of the present invention. The communication system 100 includes a first device 102, such as a client or a server, connected to a second device 106, such as a client or server. The first device 102 can communicate with the second device 106 with a network 104, such as a wireless or wired network.

For example, the first device 102 can be of any of a variety of display devices, such as a cellular phone, personal digital assistant, a notebook computer, a wearable device, automotive telematics navigation system, or other multi-functional mobile communication or entertainment device. The first device 102 can couple, either directly or indirectly, to the network 104 to communicate with the second device 106 or can be a stand-alone device. The first device 102 further can be separate from or incorporated with a vehicle, such as a car, truck, bus, or train.

For illustrative purposes, the communication system 100 is described with the first device 102 as a mobile computing device, although it is understood that the first device 102 can be different types of devices. For example, the first device 102 can also be a non-mobile computing device, such as a server, a server farm, or a desktop computer.

The second device 106 can be any of a variety of centralized or decentralized computing devices, or video transmission devices. For example, the second device 106 can be a computer, grid computing resources, a virtualized computer resource, cloud computing resource, routers, switches, peer-to-peer distributed computing devices, or a combination thereof.

The second device 106 can be centralized in a single room, distributed across different rooms, distributed across different geographical locations, embedded within a telecommunications network. The second device 106 can couple with the network 104 to communicate with the first device 102. The second device 106 can also be a client type device as described for the first device 102.

For illustrative purposes, the communication system 100 is described with the second device 106 as a non-mobile computing device, although it is understood that the second device 106 can be different types of computing devices. For example, the second device 106 can also be a mobile computing device, such as notebook computer, another client device, or a different type of client device. The second device 106 can be a standalone device, or can be incorporated with the vehicle, such as the car, the truck, the bus, or the train.

The communication system 100 can further include a third device 108. The third device 108, such as a client or a server, can be connected to the first device 102, the second device 106, or a combination thereof. The third device 108 can be similar to the first device 102, the second device 106, or a combination thereof.

For example, the third device 108 can include any variety of consumer devices, wearable devices, servers, stationary or mobile devices, centralized or decentralized devices, or a combination thereof. The third device 108 can couple, either directly or indirectly, to the network 104 to communicate with another device, couple directly to another device, or can be a stand-alone device.

For illustrative purposes, the communication system 100 is described with the third device 108 as a mobile computing device, although it is understood that the third device 108 can be different types of devices. For example, the third device 108 can also be a non-mobile computing device, such as a server, a server farm, or a desktop computer.

Also for illustrative purposes, the communication system 100 is shown with the first device 102, the second device 106, and the third device 108 as end points of the network 104, although it is understood that the communication system 100 can have a different partition between the first device 102, the second device 106, the third device 108, and the network 104. For example, the first device 102, the second device 106, the third device 108, or a combination thereof can also function as part of the network 104.

The network 104 can span and represent a variety of networks. For example, the network 104 can include wireless communication, wired communication, optical, ultrasonic, or the combination thereof. Satellite communication, cellular communication, Bluetooth, Infrared Data Association standard (IrDA), wireless fidelity (WiFi), and worldwide interoperability for microwave access (WiMAX) are examples of wireless communication that can be included in the communication path 104. Ethernet, digital subscriber line (DSL), fiber to the home (FTTH), and plain old telephone service (POTS) are examples of wired communication that can be included in the network 104. Further, the network 104 can traverse a number of network topologies and distances. For example, the network 104 can include direct connection, personal area network (PAN), local area network (LAN), metropolitan area network (MAN), wide area network (WAN), or a combination thereof.

Figure 2:
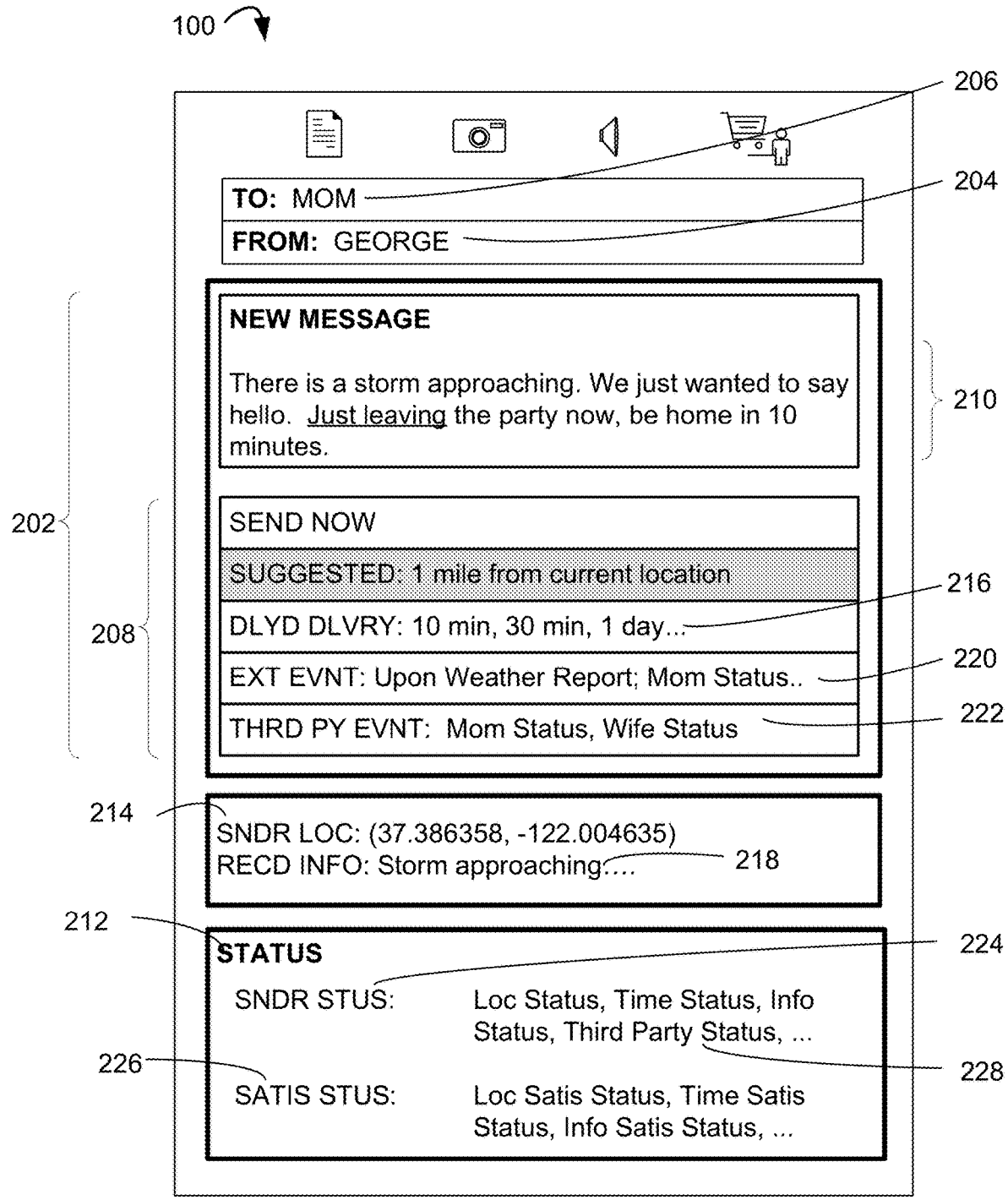
FIG. 2 is an example of a display interface for the communication system.

Referring now to FIG. 2, therein is shown an example of a display interface for the communication system 100 of FIG. 1. The display interface can show a conditional communication 202 sent by a sender 204 to a receiver 206 based on a delivery condition 208.

The sender 204 can include a person or an entity that communicates the conditional communication 202 to the receiver 206. The sender 204 can generate the conditional communication 202 or a portion therein. The sender 204 can include a user of the communication system 100. For example, the sender 204 can be the user of a mobile phone or an automated messaging service, such as the first device 102 of FIG. 1, the second device 106 of FIG. 1, or a combination thereof.

The sender 204 can use the communication system 100 to transmit the conditional communication 202, such as from a device to another device. The communication system 100 can use the first device 102, the second device 106, or a combination thereof to transmit the conditional communication 202. The communication system 100 can use the first device 102, the second device 106, or a combination thereof to place the conditional communication 202 into a message escrow account to be queued for transmission.

The first device 102 can transmit the conditional communication 202 to the network 104 of FIG. 1, the second device 106, the third device 108 of FIG. 1, or a combination thereof. The second device 106 can similarly transmit the conditional communication 202 to the network 104, the third device 108, or a combination thereof. The second device 106 can transmit the conditional communication 202 from the first device 102.

The receiver 206 is a person or entity that receives the conditional communication 202 from the sender 204. The receiver 206 can include a user of the communication system 100. The receiver 206 can include a specific recipient. For example, a text or an email can be communicated from the sender 204 to the receiver 206 such as a friend or a coworker. Also for example, the conditional communication 202 including a purchase request can be sent from the sender 204 to the receiver 206 such as a florist shop around the corner. The receiver 206 can further include non-specific recipients such as visitors to a public image hosting service, a social sharing site, or message forum.

The receiver 206 can use the communication system 100 to receive the conditional communication 202. For example, the receiver 206 can use the third device 108 to receive the conditional communication 202. The third device 108 can receive the conditional communication 202 directly from the first device 102, the network 104, or the second device 106. For example, the third device 108 can access the network 104 to receive the conditional communication 202 from a social media website using the network 104 or a text message transmitted via mobile phone provider server using the second device 106.

The conditional communication 202 is information intended to be communicated to the receiver 206 upon satisfaction of the delivery condition 208 by the sender 204. For example, the conditional communication 202 can include a text message to be communicated or accessible to a friend after the sender 204 has arrived at a destination or a specific location. Also for example, the conditional communication 202 can include images or recordings generated at a vacation location intended for uploading onto the internet based on the sender 204 returning home from vacation. In a further example, the conditional communication 202 can include an online purchase.

The conditional communication 202 can be communicated to the receiver 206 such as through displaying or audibly generating the intended information using a device of the communication system 100. The conditional communication 202 can be queued for transmission between devices or communication to the receiver 206 depending on the delivery condition 208 influenced by the sender 204. The conditional communication 202 can include or correspond to the delivery condition 208 associated with the sender 204.

The conditional communication 202 can include a content 210 representing the information intended for communication to the receiver 206. The content 210 of the conditional communication 202 can include a text, a sound, an image, a command, an instruction, or a combination thereof. The content 210 can include a message intended for communication with or to the receiver 206.

The content 210 can include in the message identifiable time, location, or other details for determining the delivery condition 208 of the conditional communication 202. For example, the content 210 of the conditional communication 202 such as a text stating "Just leaving now" can include locational or temporal indicators. Also for example, the content 210 including specific word or phrase such as "when", "if", "depending on", or "based on" and other words surrounding the word or phrase can indicate other conditional details.

The conditional communication 202 can further include the delivery condition 208 for communicating the content 210. The delivery condition 208 can determine the timing or associated conditions for controlling or initiating communication of the conditional communication 202 to the receiver 206.

The delivery condition 208 can be associated with the sender 204. The delivery condition 208 can be a condition or a status 212 of the sender 204, requiring the sender 204 to satisfy the delivery condition 208, before communicating the conditional communication 202 to the receiver 206. For example, the delivery condition 208 can be satisfied by one or more conditions or actions of the sender 204, such as the location of the sender or the information received by the sender 204.

The delivery condition 208 can be generated or provided by the sender 204, the receiver 206, the communication system 100, or a combination thereof. For example, the delivery condition 208 can be provided through a user interface by the sender 204, provided as a setting for receiving communication by the receiver 206, or determined from the content 210 of the conditional communication 202 by the communication system 100.

In a further example, the delivery condition 208 can be based on a combination of a location constraint and a time constraint. In the scenario where the sender 204 needs time to prepare for visitors arriving at his home, the message can be queued to be communicated after a specific delay time from when the sender 204 arrives home. In this scenario, the location constraint can be the "home" of the sender 204 and the time constraint can be one hour after his arrival at "home".

The delivery condition 208 can refer to the time or the location that is absolute. For example, the sender 204 can specify that a text message is communicated to the receiver 206 "more than one mile away from 1234 Main St" or "at 5 pm on April 20$^{th}$. The delivery condition 208 can refer to the location or the time that is relative to the location, the time, a future event, or combination thereof. For example, the sender 204 can specify that a text message is communicated to the receiver 206 "when I am more than 25 miles from home" or "15 minutes after I arrive home".

The delivery condition 208 can be based on or include a requirement or a condition based on a sender location 214. The sender location 214 can include a geographic position or area representing the sender 204 or the first device 102 used by the sender 204. For example, the sender location 214 can be based on a coordinate system, such as longitudinal-latitudinal or global positioning system (GPS), a street address system, or a combination thereof.

As a more specific example, the delivery condition 208 can include a fixed area around the specific longitudinal-latitudinal coordinate which is defined by user preferences. The conditional communication 202 can be delivered to the receiver 206 or transmitted to the third device 108 used or owned by the receiver 206 based on the sender location 214 being located within or crossing into the fixed area around the specific coordinate as required by the delivery condition 208.

The delivery condition 208 can be based on or include a delayed-delivery time 216. The delayed-delivery time 216 can include a future moment in time or a duration after a reference time provided by the sender 204 for communicating the conditional communication 202 to the receiver 206. The delayed-delivery time 216 can be measured using a clock, chronometer, calendar, or a combination thereof. The delayed-delivery time 216 can be specified by the sender 204. The delayed-delivery time 216 can include the absolute time or the relative time as described above. For example, the delayed-delivery time 216 can include the future moment in time or depend on an event or a condition, such as occurring at a certain amount of time before or after the event or the condition.

In a further example, the delivery condition 208 including the delayed-delivery time 216 can be a day of the week, a specified calendar date, or time based on a future event or combination thereof. In the scenario where the user wants to rent an online video for his children to watch on a trip, the sender 204 can communicate the conditional communication 202 of the video purchase with the delivery condition 208 based on the delayed-delivery time 216. The sender 204 can choose for the conditional communication 202 to be communicated on Monday, at 10:30 am on July 15$^{th}$, or ten minutes on the first day of the trip once the sender 204 is more than ten miles from home.

The delivery condition 208 can further be determined from the content 210 of the conditional communication 202 without direct specification of the delivery condition 208 by the sender 204. For example, the communication system 100 can determine the delivery condition 208 based on the sender location 214 when the content 210 of the conditional communication 202 includes "just leaving". In a further example, the communication system 100 can determine the delivery condition 208, the delayed-delivery time 216, or a combination thereof when the content 210 of the conditional communication 202 refers to the time such as "be home in 10 minutes", "let you know when you're 10 minutes away", or an affirmative reply including "yes" or "ok" to a request similar to "let me know when you're 10 minutes away".

The delivery condition 208 can be based on or include received information 218. The received information 218 can include data accessible or available to the sender 204 or the first device 102 associated with the sender 204. For example, the received information 218 can include data received from or shared by another person, entity, group, device, or a combination thereof.

Also for example, the received information 218 can include a status alert based on an event or action of another user or device other than the sender 204 or the sender's device. The received information 218 at the sender 204 can be based on an event or action by the sender 204, the receiver 206, a third party, an external event 220, or a combination thereof. The delivery condition 208 can be based on the received information 218 by or available to the sender 204 as a status update.

The delivery condition 208 can be based on or include the external event 220. The external event 220 is an occurrence or a happening involving a person, entity, object, or combination thereof other than the sender 204, receiver 206, or combination thereof. The delivery condition 208 can include the received information 218 including the external event 220. For example, the delivery condition 208 can require the external event 220 to be accessed, available to, or received by the sender 204 or the sender's device to transmit or communicate the content 210.

The external event 220 can include changes to variables outside of direct control of the receiver 206 or sender 204. For example, the external event 220 can include a result of a sporting event, a change in weather, a sale at a store, or a change or a status of a stock price.

In a further example, the external event 220 can include the change in the weather. The conditional communication 202 can include a text message with the content 210 to "bring a jacket" when temperatures drop below 70 degrees Fahrenheit. The delivery condition 208 can include the external event 220 of the temperature dropping below 70 degrees.

In another further example, the conditional communication 202 can include a message between friends to pay on a sports team wager. The sender 204 can write "Team A wins, you owe me $10", which can be communicated based on the external event 220 corresponding to a game referenced by the sender 204.

The external event 220 can include a third party event 222. The third party event 222 can be an occurrence or a happening involving a person or an entity other than the sender 204, the receiver 206, or a combination thereof. The third party event 222 can include the occurrence or the happening associated with or involved with the sender 204, the receiver 206, or a combination thereof. For example, the third party event 222 can be an arrival of a friend to meet the receiver 206 or a birthday of a relative of the sender 204.

The communication system 100 can evaluate the delivery condition 208 based on comparison of the status 212 with the delivery condition 208. The status 212 can include results from the sender 204, the external event 220, the third party event 222 associated with the sender 204, the received information 218 by the sender 204, the sender location 214, or a combination thereof. The status 212 can represent a signal generated by the communication system 100, the first device 102, another device, the sender 204, or a combination thereof. The status 212 can include a sender status 224, a third party status 226, or a combination thereof.

The sender status 224 can include monitored information about the sender 204. The sender status 224 can also include received or accessed information by the sender 204. The sender status 224 can be monitored and compared to the delivery condition 208 to establish a trigger point for transmission of the conditional communication 202. For example, the sender status 224 representing the sender location 214 can be monitored to alert the communication system 100 when the user has returned "home" from vacation. In another example, the sender status 224 representing the time and date can be monitored for the delivery condition 208 involving the absolute time.

The third party status 226 can represent a signal generated by an application, computer, device, server, or a combination thereof to notify the sender 204 of a third party event 222. The third party status 226 can include information received about the third party event 222. For example, the third party status 226 can include information about the condition of a beneficiary.

In an illustrative example, when the conditional communication 202 is a flower delivery purchase, a husband can indicate that the purchase is made when his wife, "returns home from a business trip". The third party event 222 of the wife returning home can generate the third party status 226 communicated to the husband which satisfies the delivery condition 208 for the flower arrangement purchase. The receiver 206 can include the delivery service or the flower shop and the beneficiary can include the wife.

The communication system 100 can generate a satisfaction status 228 to represent whether the delivery condition 208 has been met. The satisfaction status 228 can represent a signal generated by the communication system 100, the first device 102, another device, or the sender 204, of a combination thereof for monitoring whether the delivery condition 208 is met. The satisfaction status 228 can be a result of comparing or evaluating the status 212 with the delivery condition 208.

The satisfaction status 228 can include a result of monitored information for the sender 204, the received information 218 by the sender 204, the receiver 206, the external event 220, the third party event 222, or a combination thereof. For example, in a scenario where there is a storm and one user wants to communicate a group message saying "We've all arrived safely", the satisfaction status 228 can be based on the sender location 214 and received information 218 by the sender 204 such as the location of each individual in the group text.

Figure 3:
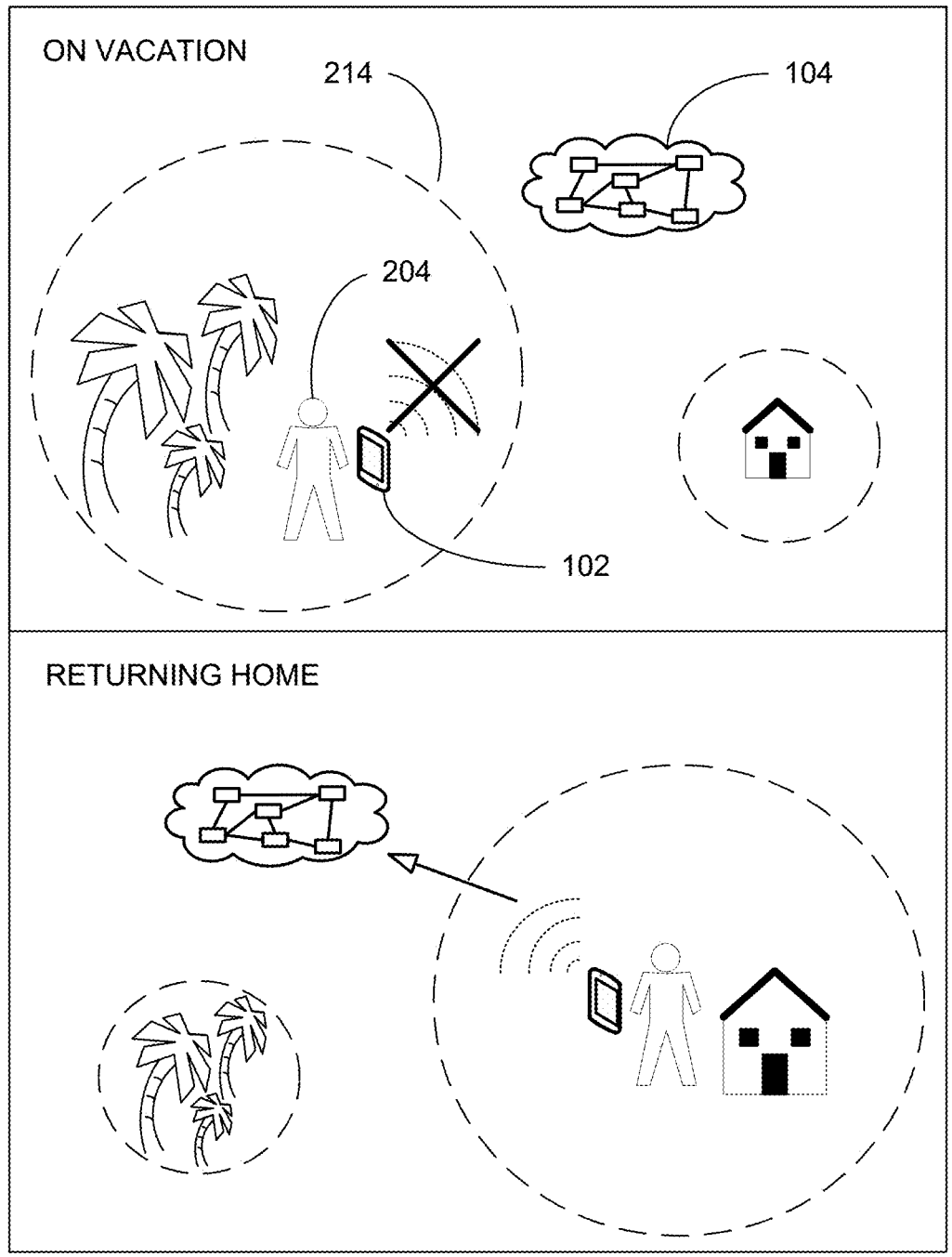
FIG. 3 is an example of a use case of the present invention based on a sender status.

Referring now to FIG. 3, therein is shown an example of the conditional communication 202 of FIG. 2 delivered based on the sender location 214. In the example, the sender 204 would like to upload the conditional communication 202 such as vacation pictures to the network 104 to be added to an image hosting site.

The delivery condition 208 of FIG. 2 can be a requirement for the sender location 214 to be within a predetermined distance from the sender's home. The delivery condition 208 can be specified by the sender 204 or determined by the communication system 100 of FIG. 1 as a safety feature for the content 210 of FIG. 2 including images taken at a location more than a predetermined distance away from the sender's home.

The communication system 100 can upload or transmit the content 210 from the first device 102 or the second device 106 of FIG. 1 based on the sender status 224 of FIG. 2 including the sender location 214. The vacation pictures can be uploaded to the receiver 206 of FIG. 2 including the image hosting site, the social networking site, or another user after the vacationer returns "home" as represented by the sender location 214 being within the predetermined distance from the sender's home. The conditional communication 202 can be transmitted once the sender 204 returns home from vacation when the sender status 224 meets the delivery condition 208.

The communication system 100 can further communicate the content 210 to the receiver 206 based on the sender location 214. For example, the content 210 including the vacation images can be uploaded to the image hosting site or the social networking site. The image hosting site or the social networking site can allow access to the content 210 by the receiver 206, such as a random unrelated viewer or a friend, only after the sender 204 returns from the vacation as described above.

The delivery condition 208 can further regulate access to the content 210 based on a familiarity level or a degree of separation between to the sender 204 and the receiver 206. The computing system 100 can use the delivery condition 208 to allow the receiver 206 with sufficient familiarity with the user, such as a family member or a friend, to access the vacation images before the sender 204 returns home. Simultaneously, the computing system 100 can use the delivery condition 208 to allow the receiver 206 with insufficient familiarity with the user, such as a stranger or a user outside of the social network of the sender 204, to access the vacation images only after the sender 204 returns home.

Figure 4:
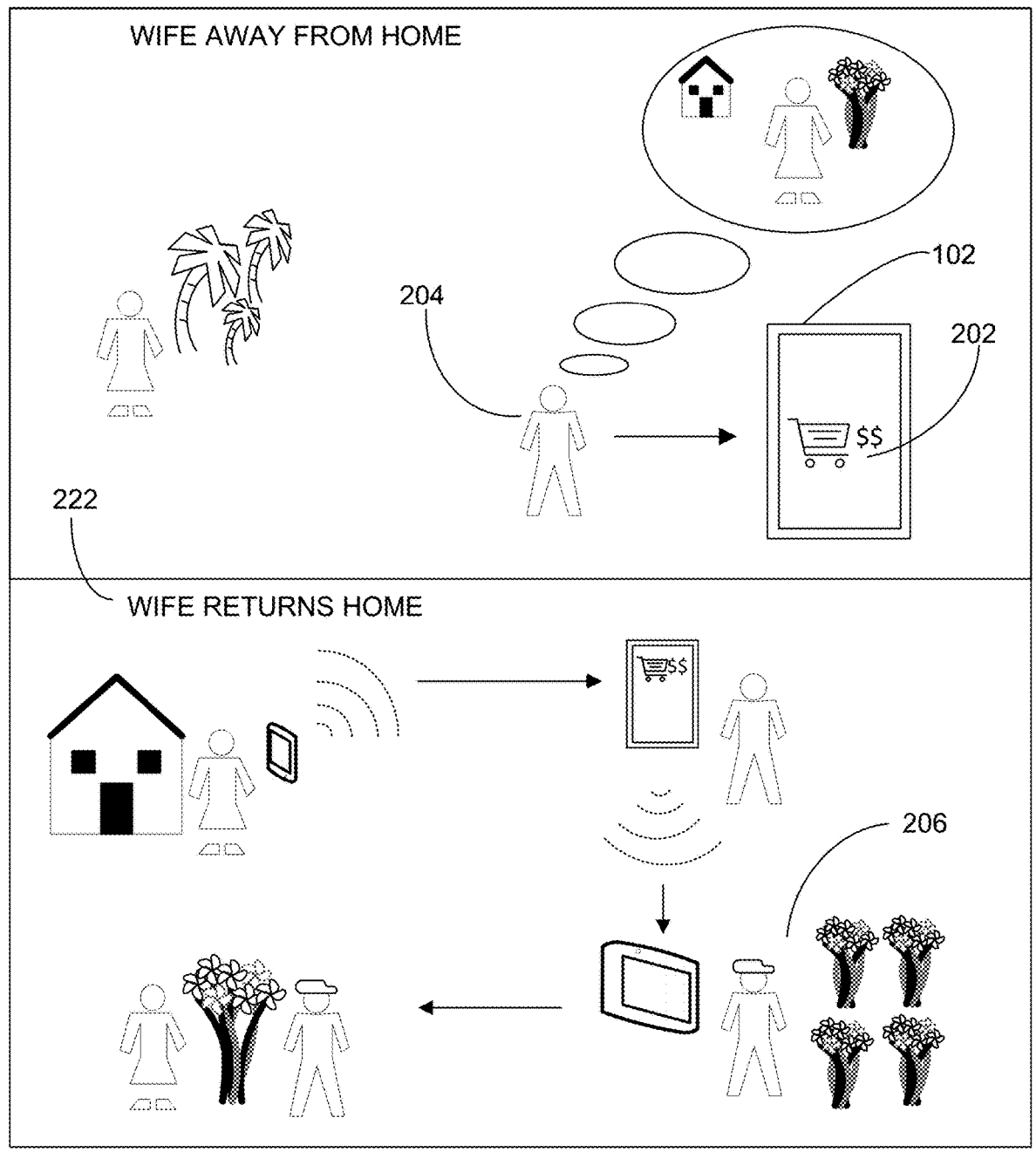
FIG. 4 is an example of a use case of the present invention based on a third party status.

Referring now to FIG. 4, therein is shown an example of the conditional communication 202 delivered based on the third party event 222. In the example, the conditional communication 202 includes a flower delivery purchase made by a husband and sent to the florist for delivery to a wife returning home. The delivery condition 208 of FIG. 2 for the conditional communication 202 can be generated by the sender 204 for delivery fifteen minutes after her arrival home.

In this example, the husband can be the sender 204 of the conditional communication 202 of the online floral purchase. The receiver 206 can be an online florist shop. The third party and the beneficiary can be the wife. The conditional communication 202 can be created by the sender 204 to be communicated to the receiver 206 once a third party status 226 of FIG. 2 has met the delivery condition 208.

The communication system 100 of FIG. 1 can communicate the content 210 of FIG. 2 for cuing or initiating the delivery of the flowers based on the wife's location as available to the sender 204 or the first device 102 used by the sender 204. For example, the husband and the wife can have a location-sharing service. The wife's location can be accessible to the sender 204 as the received information 218 of FIG. 2.

The communication system 100 can evaluated the received information 218 with "home" or a geofence associated with the sender's home for the status information. The computing system 100 can transmit the content 210 to a device associated with the florist shop or the delivery personnel, communicate the content 210 through the device, or a combination thereof based on the status information resulting from comparing the wife's location as available to the sender 204.

Figure 5:
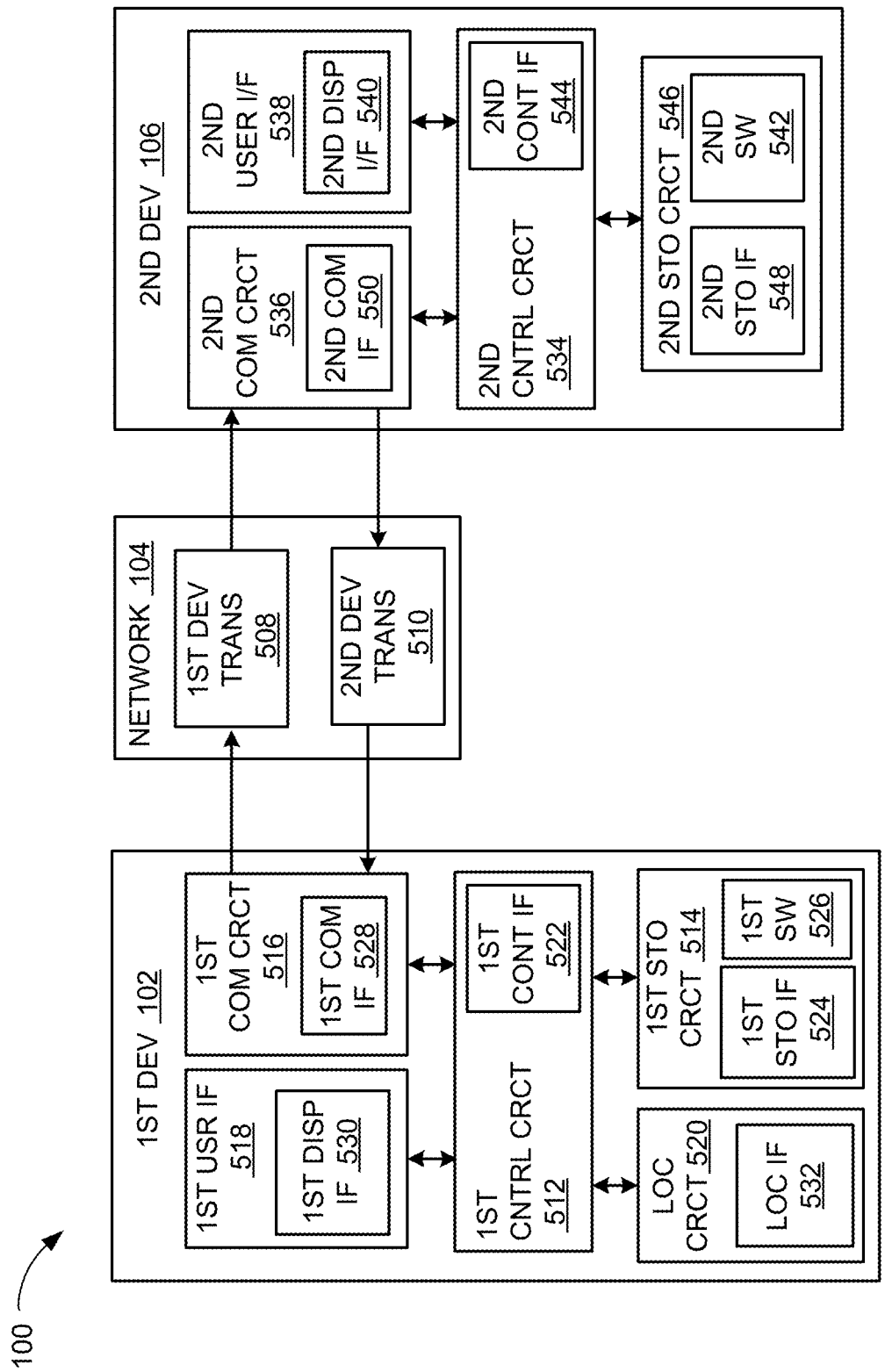
FIG. 5 is an exemplary block diagram of the communication system.

Referring now to FIG. 5, therein is shown an exemplary block diagram of the communication system 100. The communication system 100 can include the first device 102, the network 104, and the second device 106. The first device 102 can send information in a first device transmission 508 over the network 104 to the second device 106. The second device 106 can send information in a second device transmission 510 over the network 104 to the first device 102.

For illustrative purposes, the communication system 100 is shown with the first device 102 as a client device, although it is understood that the communication system 100 can have the first device 102 as a different type of device. For example, the first device 102 can be a server having a display interface.

Also for illustrative purposes, the communication system 100 is shown with the second device 106 as a server, although it is understood that the communication system 100 can have the second device 106 as a different type of device. For example, the second device 106 can be a client device.

For brevity of description in this embodiment of the present invention, the first device 102 will be described as a client device and the second device 106 will be described as a mobile device, a computing device, an appliance, a wearable device, or a combination thereof. The embodiment of the present invention is not limited to this selection for the type of devices. The selection is an example of the embodiments of the present invention.

The first device 102 can include a first control circuit 512, a first storage circuit 514, a first communication circuit 516, and a first user interface 518, a location circuit 520, or a combination thereof. The first control circuit 512 can include a first control interface 522. The first control circuit 512 can execute a first software 526 to provide the intelligence of the communication system 100.

The first control circuit 512 can be implemented in a number of different manners. For example, the first control circuit 512 can be a processor, an application specific integrated circuit (ASIC) an embedded processor, a microprocessor, a hardware control logic, a hardware finite state machine (FSM), a digital signal processor (DSP), or a combination thereof. The first control interface 522 can be used for communication between the first control circuit 512 and other functional units or circuits in the first device 102. The first control interface 522 can also be used for communication that is external to the first device 102.

The first control interface 522 can receive information from the other functional units or circuits or from external sources, or can transmit information to the other functional units or circuits or to external destinations. The external sources and the external destinations refer to sources and destinations external to the first device 102.

The first control interface 522 can be implemented in different ways and can include different implementations depending on which functional units or circuits or external units or circuits are being interfaced with the first control interface 522. For example, the first control interface 522 can be implemented with a pressure sensor, an inertial sensor, a microelectromechanical system (MEMS), optical circuitry, waveguides, wireless circuitry, wireline circuitry, or a combination thereof.

The first storage circuit 514 can store the first software 526. The first storage circuit 514 can also store the relevant information, such as data representing incoming images, data representing previously presented image, sound files, or a combination thereof.

The first storage circuit 514 can be a volatile memory, a nonvolatile memory, an internal memory, an external memory, or a combination thereof. For example, the first storage circuit 514 can be a nonvolatile storage such as non-volatile random access memory (NVRAM), Flash memory, disk storage, or a volatile storage such as static random access memory (SRAM).

The first storage circuit 514 can include a first storage interface 524. The first storage interface 524 can be used for communication between the first storage circuit 514 and other functional units or circuits in the first device 102. The first storage interface 524 can also be used for communication that is external to the first device 102.

The first storage interface 524 can receive information from the other functional units or circuits or from external sources, or can transmit information to the other functional units or circuits or to external destinations. The external sources and the external destinations refer to sources and destinations external to the first device 102.

The first storage interface 524 can include different implementations depending on which functional units or circuits or external units or circuits are being interfaced with the first storage circuit 514. The first storage interface 524 can be implemented with technologies and techniques similar to the implementation of the first control interface 522.

The first communication circuit 516 can enable external communication to and from the first device 102. For example, the first communication circuit 516 can permit the first device 102 to communicate with the second device 106, an attachment, such as a peripheral device or a desktop computer, and the network 104.

The first communication circuit 516 can also function as a communication hub allowing the first device 102 to function as part of the network 104 and not limited to be an end point or terminal unit or circuit to the network 104. The first communication circuit 516 can include active and passive components, such as microelectronics or an antenna, for interaction with the network 104.

The first communication circuit 516 can include a first communication interface 528. The first communication interface 528 can be used for communication between the first communication circuit 516 and other functional units or circuits in the first device 102. The first communication interface 528 can receive information from the other functional units or circuits, or can transmit information to the other functional units or circuits.

The first communication interface 528 can include different implementations depending on which functional units or circuits are being interfaced with the first communication circuit 516. The first communication interface 528 can be implemented with technologies and techniques similar to the implementation of the first control interface 522.

The first user interface 518 allows a user (not shown) to interface and interact with the first device 102. The first user interface 518 can include an input device and an output device. Examples of the input device of the first user interface 518 can include a keypad, a touchpad, soft-keys, a keyboard, a microphone, a camera, an infrared sensor for receiving remote signals, or any combination thereof to provide data and communication inputs.

The first user interface 518 can include a first display interface 530. The first display interface 530 can include an output device. The first display interface 530 can include a display, a projector, a video screen, a speaker, or any combination thereof.

The first control circuit 512 can operate the first user interface 518 to display information generated by the communication system 100. The first control circuit 512 can also execute the first software 526 for the other functions of the communication system 100, including receiving location information from the location circuit 520. The first control circuit 512 can further execute the first software 526 for interaction with the network 104 via the first communication circuit 516

The location circuit 520 can generate location information, current heading, current acceleration, and current speed of the first device 102, as examples. The location circuit 520 can be implemented in many ways. For example, the location circuit 520 can function as at least a part of the global positioning system, an inertial navigation system, a cellular-tower location system, a pressure location system, or any combination thereof. Also, for example, the location circuit 520 can utilize components such as an accelerometer or GPS receiver.

The location circuit 520 can include a location interface 532. The location interface 532 can be used for communication between the location circuit 520 and other functional units or circuits in the first device 102. The location interface 532 can also be used for communication external to the first device 102.

The location interface 532 can receive information from the other functional units or circuits or from external sources, or can transmit information to the other functional units or circuits or to external destinations. The external sources and the external destinations refer to sources and destinations external to the first device 102.

The location interface 532 can include different implementations depending on which functional units or circuits or external units or circuits are being interfaced with the location circuit 520. The location interface 532 can be implemented with technologies and techniques similar to the implementation of the first control circuit 512.

The second device 106 can be optimized for implementing an embodiment of the present invention in a multiple device embodiment with the first device 102. The second device 106 can provide the additional or higher performance processing power compared to the first device 102. The second device 106 can include a second control circuit 534, a second communication circuit 536, a second user interface 538, and a second storage circuit 546.

The second user interface 538 allows a user (not shown) to interface and interact with the second device 106. The second user interface 538 can include an input device and an output device. Examples of the input device of the second user interface 538 can include a keypad, a touchpad, softkeys, a keyboard, a microphone, a camera, or any combination thereof to provide data and communication inputs. Examples of the output device of the second user interface 538 can include a second display interface 540. The second display interface 540 can include a display, a projector, a video screen, a speaker, or any combination thereof.

The second control circuit 534 can execute a second software 542 to provide the intelligence of the second device 106 of the communication system 100. The second software 542 can operate in conjunction with the first software 526. The second control circuit 434 can provide additional performance compared to the first control circuit 512.

The second control circuit 534 can operate the second user interface 538 to display information. The second control circuit 534 can also execute the second software 542 for the other functions of the communication system 100, including operating the second communication circuit 536 to communicate with the first device 102 over the network 104.

The second control circuit 534 can be implemented in a number of different manners. For example, the second control circuit 534 can be a processor, an embedded processor, a microprocessor, hardware control logic, a hardware finite state machine (FSM), a digital signal processor (DSP), or a combination thereof.

The second control circuit 534 can include a second control interface 544. The second control interface 544 can be used for communication between the second control circuit 534 and other functional units or circuits in the second device 106. The second control interface 544 can also be used for communication that is external to the second device 106.

The second control interface 544 can receive information from the other functional units or circuits or from external sources, or can transmit information to the other functional units or circuits or to external destinations. The external sources and the external destinations refer to sources and destinations external to the second device 106.

The second control interface 544 can be implemented in different ways and can include different implementations depending on which functional units or circuits or external units or circuits are being interfaced with the second control interface 544. For example, the second control interface 544 can be implemented with a pressure sensor, an inertial sensor, a microelectromechanical system (MEMS), optical circuitry, waveguides, wireless circuitry, wireline circuitry, or a combination thereof.

A second storage circuit 546 can store the second software 542 The second storage circuit 546 can also store the information such as data representing incoming images, data representing previously presented image, sound files, or a combination thereof. The second storage circuit 546 can be sized to provide the additional storage capacity to supplement the first storage circuit 514.

For illustrative purposes, the second storage circuit 546 is shown as a single element, although it is understood that the second storage circuit 546 can be a distribution of storage elements. Also for illustrative purposes, the communication system 100 is shown with the second storage circuit 546 as a single hierarchy storage system, although it is understood that the communication system 100 can have the second storage circuit 546 in a different configuration. For example, the second storage circuit 546 can be formed with different storage technologies forming a memory hierarchal system including different levels of caching, main memory, rotating media, or off-line storage.

The second storage circuit 546 can be a volatile memory, a nonvolatile memory, an internal memory, an external memory, or a combination thereof. For example, the second storage circuit 546 can be a nonvolatile storage such as non-volatile random access memory (NVRAM), Flash memory, disk storage, or a volatile storage such as static random access memory (SRAM).

The second storage circuit 546 can include a second storage interface 548. The second storage interface 548 can be used for communication between the second storage circuit 546 and other functional units or circuits in the second device 106. The second storage interface 548 can also be used for communication that is external to the second device 106.

The second storage interface 548 can receive information from the other functional units or circuits or from external sources, or can transmit information to the other functional units or circuits or to external destinations. The external sources and the external destinations refer to sources and destinations external to the second device 106.

The second storage interface 548 can include different implementations depending on which functional units or circuits or external units or circuits are being interfaced with the second storage circuit 546. The second storage interface 548 can be implemented with technologies and techniques similar to the implementation of the second control interface 544.

The second communication circuit 536 can enable external communication to and from the second device 106. For example, the second communication circuit 546 can permit the second device 106 to communicate with the first device 102 over the network 104.

The second communication circuit 536 can also function as a communication hub allowing the second device 106 to function as part of the network 104 and not limited to be an end point or terminal unit or circuit to the network 104. The second communication circuit 536 can include active and passive components, such as microelectronics or an antenna, for interaction with the network 104.

The second communication circuit 536 can include a second communication interface 550. The second communication interface 550 can be used for communication between the second communication circuit 536 and other functional units or circuits in the second device 106. The second communication interface 550 can receive information from the other functional units or circuits or can transmit information to the other functional units or circuits.

The second communication interface 550 can include different implementations depending on which functional units or circuits are being interfaced with the second communication circuit 536. The second communication interface 550 can be implemented with technologies and techniques similar to the implementation of the second control interface 544.

The first communication circuit 516 can couple with the network 104 to send information to the second device 106 in the first device transmission 508. The second device 106 can receive information in the second communication circuit 536 from the first device transmission 508 of the network 104.

The second communication circuit 536 can couple with the network 104 to send information to the first device 102 in the second device transmission 510. The first device 102 can receive information in the first communication circuit 516 from the second device transmission 510 of the network 104. The communication system 100 can be executed by the first control circuit 512, the second control circuit 534, or a combination thereof. For illustrative purposes, the second device 106 is shown with the partition having the second user interface 538, the second storage circuit 546, the second control circuit 534, and the second communication circuit 536, although it is understood that the second device 106 can have a different partition. For example, the second software 542 can be partitioned differently such that some or all of its function can be in the second control circuit 534 and the second communication circuit 536. Also, the second device 106 can include other functional units or circuits not shown in FIG. 5 for clarity.

The functional units or circuits in the first device 102 can work individually and independently of the other functional units or circuits. The first device 102 can work individually and independently from the second device 106 and the network 104.

The functional units or circuits in the second device 106 can work individually and independently of the other functional units or circuits. The second device 106 can work individually and independently from the first device 102 and the network 104.

The functional units or circuits described above can be implemented in hardware. For example, one or more of the functional units or circuits can be implemented using the a gate, circuitry, a processor, a computer, integrated circuit, integrated circuit cores, a pressure sensor, an inertial sensor, a microelectromechanical system (MEMS), a passive device, a physical non-transitory memory medium having instructions for performing the software function, a portion therein, or a combination thereof.

For illustrative purposes, the communication system 100 is described by operation of the first device 102 and the second device 106. It is understood that the first device 102 and the second device 106 can operate any of the modules and functions of the communication system 100.

Figure 6:
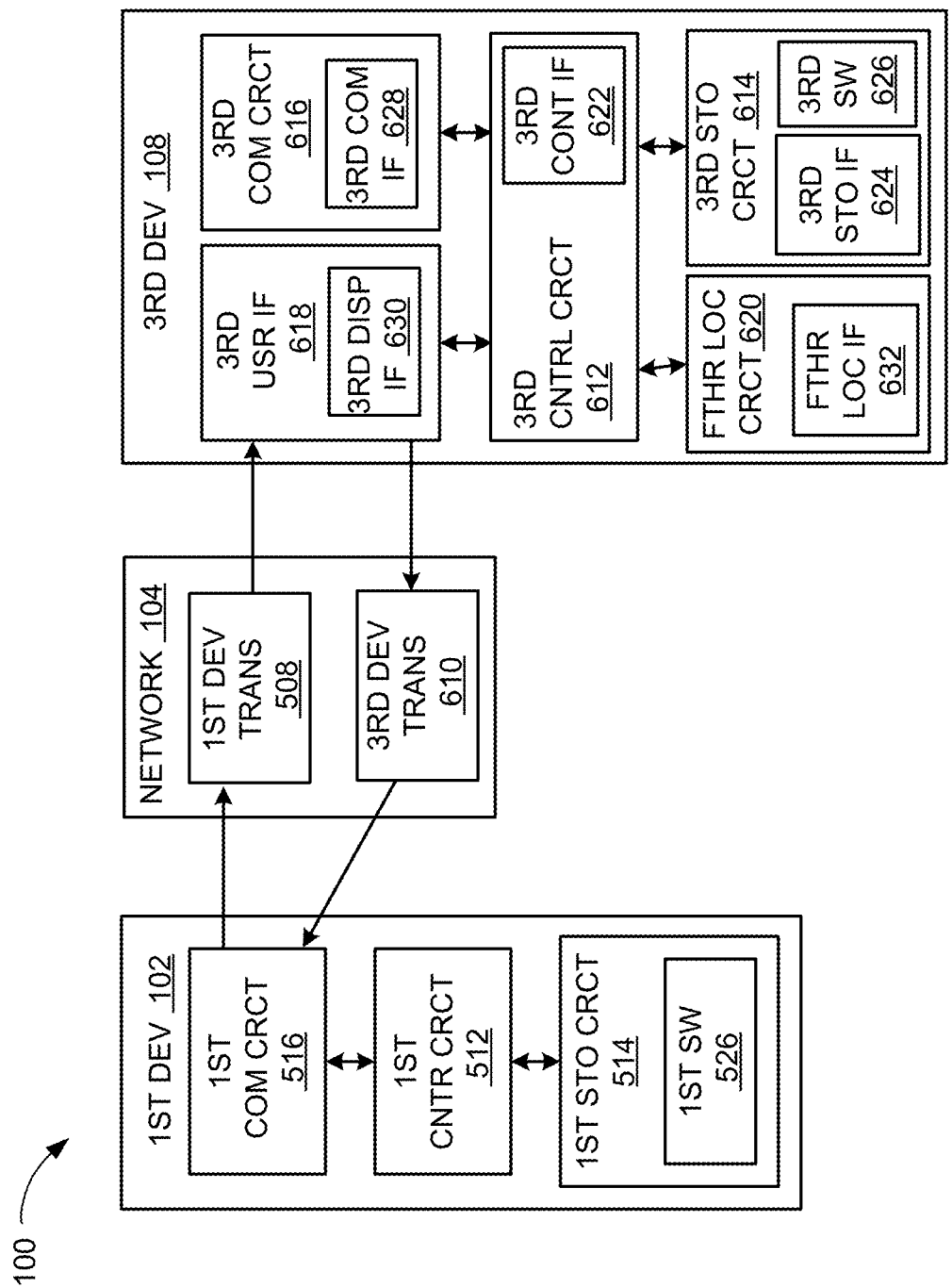
FIG. 6 is a further exemplary block diagram of the communication system.

Referring now to FIG. 6, therein is shown a further exemplary block diagram of the communication system 100 of FIG. 1. Along with the first device 102 of FIG. 1 and the second device 106 of FIG. 1, the communication system 100 can include the third device 108 of FIG. 1. The first device 102 can send information in the first device transmission 508 of FIG. 5 over the network 104 to the third device 108. The third device 108 can send information in a third device transmission 610 over the network 104 to the first device 102, the second device 106, or a combination thereof.

For illustrative purposes, the communication system 100 is shown with the third device 108 as a client device, although it is understood that the communication system 100 can have the third device 108 as a different type of device. For example, the third device 108 can be a server.

Also for illustrative purposes, the communication system 100 is shown with the first device 102 communicating with the third device 108. However, it is understood that the second device 106, or a combination thereof can also communicate with the third device 108 in a similar manner as the communication between the first device 102 and the second device 106.

For brevity of description in this embodiment of the present invention, the third device 108 will be described as a client device. The embodiment of the present invention is not limited to this selection for the type of devices. The selection is an example of an embodiment of the present invention.

The third device 108 can be optimized for implementing an embodiment of the present invention in a multiple device or multiple user embodiments with the first device 102. The third device 108 can provide the additional or specific functions compared to the first device 102, the second device 106, or a combination thereof. The third device 108 can further be a device owned or used by a separate user different from the user of the first device 102.

The third device 108 can include a third control circuit 612 a third storage circuit 614 a third communication circuit 616 a third user interface 618 a further location circuit 620, or a combination thereof. The third control circuit 612 can include a third control interface 622. The third control circuit 612 can execute a third software 626 to provide the intelligence of the communication system 100.

The third control circuit 612 can be implemented in a number of different manners. For example, the third control circuit 612 can be a processor, an application specific integrated circuit (ASIC) an embedded processor, a microprocessor, a hardware control logic, a hardware finite state machine (FSM), a digital signal processor (DSP), or a combination thereof. As a more specific example, the third control circuit 612 can include a processor, an embedded processor, a microprocessor, a hardware control logic, a hardware FSM, a DSP, or a combination thereof configured to execute or implement any software or instruction. Also as a more specific example, the third control circuit 612 can include circuitry, such as a hardware FSM, a DSP, FPGA, digital logic, or a combination thereof configured specifically in hardware to execute or implement a function.

The third control interface 622 can be used for communication between the third control circuit 612 and other functional units or circuits in the third device 108. The third control interface 622 can also be used for communication that is external to the third device 108.

The third control interface 622 can receive information from the other functional units or circuits or from external sources, or can transmit information to the other functional units or circuits or to external destinations. The external sources and the external destinations refer to sources and destinations external to the third device 108.

The third control interface 622 can be implemented in different ways and can include different implementations depending on which functional units or circuits or external units or circuits are being interfaced with the third control interface 622. For example, the third control interface 622 can be implemented with a pressure sensor, an inertial sensor, a microelectromechanical system (MEMS), optical circuitry, waveguides, wireless circuitry, wireline circuitry, or a combination thereof.

The third storage circuit 614 can store the third software 626. The third storage circuit 614 can also store the relevant information, such as data representing incoming images, data representing previously presented image, sound files, or a combination thereof.

The third storage circuit 614 can be a volatile memory, a nonvolatile memory, an internal memory, an external memory, or a combination thereof. For example, the third storage circuit 614 can be a nonvolatile storage such as non-volatile random access memory (NVRAM), Flash memory, disk storage, or a volatile storage such as static random access memory (SRAM). Also for example, the third storage circuit 614 can be distribution of storage elements, multiple hierarchy storage system including different levels of caching, main memory, rotating media, or off-line storage, or a combination thereof.

The third storage circuit 614 can include a third storage interface 624. The third storage interface 624 can be used for communication between the third storage circuit 614 and other functional units or circuits in the third device 108. The third storage interface 624 can also be used for communication that is external to the third device 108.

The third storage interface 624 can receive information from the other functional units or circuits or from external sources, or can transmit information to the other functional units or circuits or to external destinations. The external sources and the external destinations refer to sources and destinations external to the third device 108.

The third storage interface 624 can include different implementations depending on which functional units or circuits or external units or circuits are being interfaced with the third storage circuit 614. The third storage interface 624 can be implemented with technologies and techniques similar to the implementation of the third control interface 622.

The third communication circuit 616 can enable external communication to and from the third device 108. For example, the third communication circuit 616 can permit the third device 108 to communicate with the second device 106, the first device 102, a different device, an attachment, such as a peripheral device or a desktop computer, the network 104, or a combination thereof.

The third communication circuit 616 can also function as a communication hub allowing the third device 108 to function as part of the network 104 and not limited to be an end point or terminal unit or circuit to the network 104. The third communication circuit 616 can include active and passive components, such as microelectronics or an antenna, for interaction with the network 104.

The third communication circuit 616 can include a baseband device or component, a modem, a digital signal processor, or a combination thereof for transmitting, formatting, receiving, detecting, decoding, further processing, or a combination thereof for communication signals. The third communication circuit 616 can include one or more portions for processing the voltages, the currents, the digital information, or a combination thereof, such as an analog-to-digital converter, a digital-to-analog converter, a filter, an amplifier, a processor-type circuitry, or a combination thereof. The third communication circuit 616 can further include one or more portions for storing information, such as cache or RAM memory, registers, or a combination thereof.

The third communication circuit 616 can include a third communication interface 628. The third communication interface 628 can be used for communication between the third communication circuit 616 and other functional units or circuits in the third device 108. The third communication interface 628 can receive information from the other functional units or circuits or can transmit information to the other functional units or circuits.

The third communication interface 628 can include different implementations depending on which functional units or circuits are being interfaced with the third communication circuit 616. The third communication interface 628 can be implemented with technologies and techniques similar to the implementation of the third control interface 622.

The third user interface 618 allows a user (not shown) to interface and interact with the third device 108. The third user interface 618 can include an input device and an output device. Examples of the input device of the third user interface 618 can include a keypad, a touchpad, soft-keys, a keyboard, a microphone, an infrared sensor for receiving remote signals, or any combination thereof to provide data and communication inputs.

The third user interface 618 can include a third display interface 630. The third display interface 630 can include an output device. The third display interface 630 can include a display, a projector, a video screen, a speaker, or any combination thereof.

The third control circuit 612 can operate the third user interface 618 to display information generated by the communication system 100. The third control circuit 612 can also execute the third software 626 for the other functions of the communication system 100, including receiving location information from the further location circuit 620. The third control circuit 612 can further execute the third software 626 for interaction with the network 104 via the third communication circuit 616.

The further location circuit 620 can generate location information, current heading, current acceleration, and current speed of the third device 108, as examples. The further location circuit 620 can be implemented in many ways. For example, the further location circuit 620 can function as at least a part of the global positioning system, an inertial computing system, a cellular-tower location system, a pressure location system, or any combination thereof. Also, for example, the further location circuit 620 can utilize components such as an accelerometer or GPS receiver.

The further location circuit 620 can include a further location interface 632. The further location interface 632 can be used for communication between the further location circuit 620 and other functional units or circuits in the third device 108. The further location interface 632 can also be used for communication external to the third device 108.

The further location interface 632 can receive information from the other functional units or circuits or from external sources, or can transmit information to the other functional units or circuits or to external destinations. The external sources and the external destinations refer to sources and destinations external to the third device 108.

The further location interface 632 can include different implementations depending on which functional units or circuits or external units or circuits are being interfaced with the further location circuit 620. The further location interface 632 can be implemented with technologies and techniques similar to the implementation of the third control circuit 612.

For illustrative purposes, the third device 108 is shown with the partition having the third user interface 618, the third storage circuit 614, the third control circuit 612, and the third communication circuit 616, although it is understood that the third device 108 can have a different partition. For example, the third software 626 can be partitioned differently such that some or all of its function can be in the third control circuit 612 and the third communication circuit 616. Also, the third device 108 can include other functional units or circuits not shown in FIG. 6 for clarity.

The functional units or circuits in the third device 108 can work individually and independently of the other functional units or circuits. The third device 108 can work individually and independently from the first device 102, the second device 106, and the network 104.

For illustrative purposes, the communication system 100 is described by operation of the first device 102 and the third device 108. It is understood that the first device 102, the second device 106, and the third device 108 can operate any of the modules and functions of the communication system 100.

Figure 7:
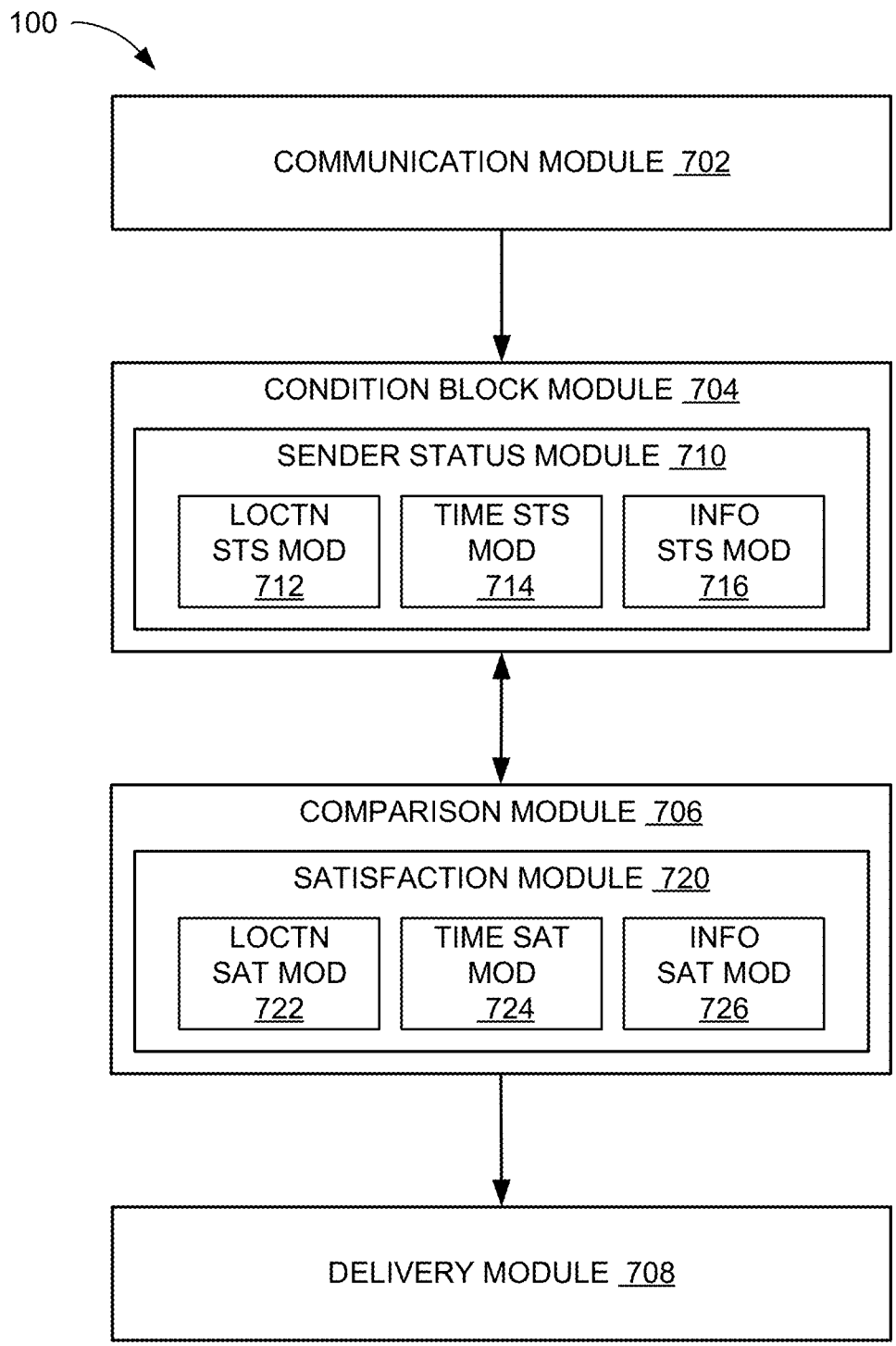
FIG. 7 is a control flow of the communication device.

Referring now to FIG. 7, therein is shown a control flow of the communication system 100. The communication system 100 can include a communication module 702, a condition block module 704, a comparison module 706, a delivery module 708, or a combination thereof.

The communication module 702 can be coupled to the condition block module 704 using wired or wireless connections, by having an output of one module as an input of the other module, by having operations of one module influence operations of the other module, or a combination thereof. Similarly, the condition block module 704 can be coupled to the comparison module 706 as described above. The comparison module 706 can be coupled to the delivery module 708 as described above.

The communication module 702 is configured to determine the conditional communication 202 of FIG. 2. The communication module 702 can determine the conditional communication 202 by receiving the content 210 of FIG. 2 from the user, identifying the content 210 stored within a device, or a combination thereof.

The communication module 702 can receive the content 210 using the first user interface 518 of FIG. 5, the first control interface 522 of FIG. 5, the first storage interface 524 of FIG. 5, the first display interface 530 of FIG. 5, the location interface 532 of FIG. 5, the first communication interface 528 of FIG. 5, the second user interface 538 of FIG. 5, the second control interface 544 of FIG. 5, the second storage interface 548 of FIG. 5, the second communication interface 550 of FIG. 5, or a combination thereof. The communication module 702 can further access and identify the stored instance of the content 210 using one or more of the interfaces listed above.

The communication module 702 can queue the conditional communication 202 for transmission by placing the conditional communication 202 into the message escrow account. The communication module 702 can place the conditional communication 202 into the message escrow account for temporary storage of the content 210 for transmission at a later time based on or pending satisfaction of the conditions determined by the sender 204 of FIG. 2. The communication module 702 can utilize the first storage circuit 514 of FIG. 5, the first communication circuit 516 of FIG. 5, the second communication circuit 536 of FIG. 5, the second storage circuit 546 of FIG. 5, or a combination thereof for queuing of the conditional communication 202 into the message escrow account.

After determining the conditional communication 202, the control flow can pass from the communication module 702 to the condition block module 704. The control flow can pass by having the conditional communication 202 or portion therein as an output from the communication module 702 to an input for the condition block module 704, storing the conditional communication 202 at a location known and accessible to the condition block module 704, by notifying the condition block module using a flag, an interrupt, a status signal, or a combination thereof, or combination of processes thereof.

The condition block module 704 is configured to determine the delivery condition 208 of FIG. 2 for the conditional communication 202. The condition block module 704 can determine the delivery condition 208 for communicating the conditional communication 202 to the receiver 206 of FIG. 2 based on the sender 204.

The condition block module 704 can determine the delivery condition 208 in a variety of ways. For example, the condition block module 704 can determine the delivery condition 208 based on receiving the delivery condition 208 directly from the sender 204, by generating the delivery condition 208 from other related or contextual parameters associated with the content 210, or a combination thereof. The condition block module 704 can receive the delivery condition 208 from the sender 204 through the first user interface 518, the first control interface 522, the first storage interface 524, the first display interface 530, the location interface 532, the second user interface 538, the second control interface 544, the second storage interface 548, the second communication interface 550, or a combination thereof.

For example, the condition block module 704 can display or audibly communicate predetermined instances of display screen, menu, selection choices, settings, or a combination thereof to the sender 204. The condition block module 704 can receive the conditional communication 202 as stimulus, inputs, values, selections, or a combination thereof from or in response to the displayed or audibly communicated information.

The condition block module 704 can enable the sender 204 to select or designate one or more objectives for evaluation in triggering or initiating the communication of the conditional communication 202, the objectives such as an occurrence, an event, a state or a status, a specific value or parameter, a fact, or a combination thereof available for verification. The condition block module 704 can further enable the sender 204 to select one or more logical or sequential specifier or condition along with the objectives, such as "IF", "THEN", "AND", "OR", "AFTER", "BEFORE", "WREN", "BASED ON", or a combination thereof.

The condition block module 704 can determine the delivery condition 208 based on the sender location 214 of FIG. 2, the delayed-delivery time 216 of FIG. 2, the sender status 224 of FIG. 2, the received information 218 of FIG. 2, or a combination thereof for representing the sender 204. The condition block module 704 can determine the delivery condition 208 using the first control circuit 512 of FIG. 5, the first communication circuit 516, the second control circuit 534 of FIG. 5, or a combination thereof.

The condition block module 704 can determine the delivery condition 208 for requiring the sender 204 to satisfy the delivery condition 208 in delivering the conditional communication 202 to the receiver 206. For example, when the conditional communication 202 is an upload of vacation photos to an image sharing service after the user returns home from vacation, the condition block module 704 can determine the delivery condition 208 based on the sender location 214. In a further example, when the delivery condition 208 includes the external event 220 of FIG. 2, such a sports team outcome, the condition block module 704 can require the sender 204 to receive information about the external event 220 to satisfy the delivery condition 208.

The condition block module 704 can determine the delivery condition 208 based on the content 210 within the conditional communication 202. The condition block module 704 can identify the delivery condition 208 from the content 210 within the conditional communication 202. The condition block module 704 can use a method, a process, an equation, or a combination thereof predetermined by the communication system 100 to determine the delivery condition 208 from the content 210 within the conditional communication 202. Further, the condition block module 704 can use both present and past conditional communication 202 to establish the delivery condition 208.

The condition block module 704 can further determine the delivery condition 208 by receiving the conditional communication 202 including the content 210 without the delivery condition 208 for communicating the content 210 generated by the sender 204. For example, when the conditional communication 202 includes the text "just left", the condition block module 704 can suggest the delivery condition 208 based on a distance away from the location where the conditional communication 202 was generated.

The condition block module 704 can determine the delivery condition 208 based on the content 210 or other associated information. For example, the condition block module 704 can determine a type or a category of the data of the content 210 or a portion therein, identify specific values of data within the content 210, such as keywords or location tags, determine surrounding or contextual information, such as sender's current or previous location or time associated with the message, or a combination thereof. The condition block module 704 can determine the delivery condition 208 based on generating one or more objectives, specifiers or conditions, or a combination thereof from analyzing the content 210.

The condition block module 704 can include types or categories of data, specific values within the content 210, sources of contextual or surrounding information, specific values of contextual or surrounding information, or a combination thereof predetermined by the computing system 100. The condition block module 704 can further include an equation, a mechanism, a set of scenarios or cases, or a combination thereof for analyzing the content 210 and for generating the delivery condition 208 based on the content 210 as predetermined by the computing system 100.

As a more specific example, the condition block module 704 can include scenarios or cases for identifying the content 210 including images sourced or generated at a location further than a predetermined distance away from an area identified as "home" of the sender 204. The condition block module 704 can further include the scenarios or cases for recognizing the receiver 206 associated with social services or publically available access, such as social networking websites, photo sharing services, publically accessible storage space, or a combination thereof. The condition block module 704 can generate the delivery condition 208 as requiring the sender 204 to be at "home", within a threshold distance from "home", connected to a communication device associated with "home", such as a router or a home-security system, or a combination thereof for initiating or implementing communication of the conditional communication 202 or the content 210 to the receiver 206.

Also as a more specific example, the condition block module 704 can include scenarios or cases for identifying key words or phrases in the content 210 or the contextual data for delayed or conditional communication 202, such as "[I/we] will let you know . . . ", "[I/we] will [contact/email/call/text] . . . ", "when" or "if", "before" or "after", or a combination thereof. The condition block module 704 can further include scenarios or cases for identifying changes in relative distances between the sender 204, the receiver 206, "home" or an event location associated thereto, or a combination thereof, such as representative of arrivals or departures for trips to or from each other.

Continuing with the specific example, the condition block module 704 can generate the delivery condition 208 based on the keywords or phrases, changes in relative distances, or a combination thereof for requiring the sender 204 to be at, within, or outside of a threshold area associated with the relative distances for communicating the content 210. The sender 204 can use such instance of the conditional communication 202 to inform the receiver 206 of safe arrival, pickup or transportation arrangements, schedule coordination, update on estimated time of arrival, or a combination thereof.

The condition block module 704 can determine the delivery condition 208 for communicating the conditional communication 202 based on the external event 220. The condition block module 704 can receive or generate information based on the external event 220, such as the third party event 222 of FIG. 2 associated with the sender 204. For example, when the user wants to communicate that all of the members of the group text arrived safety to separate locations, the condition block module 704 can use received information 218 received by the sender 204 about the location of each member of the group text as the delivery condition 208.

The condition block module 704 can further include a sender status module 710 for generating the sender status 224. The sender status module 710 is configured to generate the sender status 224. The sender status module 710 can generate the sender status 224 based on the sender location 214, the time, the external event 220, the third party event 222, the received information 218, or a combination thereof for comparison with the delivery condition 208.

The sender status module 710 can generate the sender status 224 by generating a logical statement resulting in "true" or "false" values. The sender status module 710 can utilize one or more logical or sequential specifier or condition along with the objectives, such as "IF", "THEN", "AND", "OR", "AFTER", "BEFORE", "WHEN", "BASED ON", or a combination thereof. The sender status module 710 can determine boundary conditions for the logical statement based on pre-determined user preferences or selections made by the sender 204. The logical statement result can be stored and updated for use by other modules.

The sender status module 710 can generate the sender status 224 using the first control circuit 512, the first communication circuit 516, the location circuit 520 of FIG. 5, the second control circuit 534, the second communication circuit 536, or a combination thereof. The sender status module 710 can generate the sender status 224 including a current value or data resulting from monitoring the sender location 214, the time, the external event 220, the received information 218, or a combination thereof.

The sender status module 710 can further include a location status module 712, a time status module 714, and an information status module 716 for generating the sender status 224 of FIG. 2. The sender status module 710 can use the sub-modules when the various input data matches the scenario as predetermined by the communication system 100.

The location status module 712 is configured to generate the sender status 224 based on the sender location 214. The location status module 712 can utilize user preferences to establish boundary conditions for the logical statements to monitor the sender location 214. The location status module 712 can monitor the sender location 214 using the first control circuit 512, the first communication circuit 516, the location circuit 520, the second control circuit 534, the second communication circuit 536, or a combination thereof.

The time status module 714 is configured to generate the sender status 224 based on the absolute time. The time status module 714 can generate the status 212, such as the sender status 224 based on the absolute time. The time status module 714 can monitor the time using the first control circuit 512, the first communication circuit 516, the location circuit 520, the second control circuit 534, second communication circuit 536, or a combination thereof.

The information status module 716 is configured to generate the sender status 224 based on the received information 218 to the sender 204. The information status module 716 can monitor the received information 218 to the sender 204 based on the delivery condition 208. The received information 218 can take the form of alerts, stimulus, inputs, or a combination thereof. The received information 218 can be monitored continuously or at periodic intervals. The information status module 716 can further include an equation, a mechanism, a set of scenarios or cases, or a combination thereof for analyzing the content 210 of the received information 218 to satisfy the logical statement for the sender status 224.

The information status module 716 can monitor the received information 218 using the first control circuit 512, the first communication circuit 516, the location circuit 520, the second control circuit 534, the second communication circuit 536, or a combination thereof. The information status module 716 can further use the first storage circuit 514 or the second storage circuit 546 to store the sender status 224 for later use.

The information status module 716 can generate the sender status 224 for representing the sender 204 associated with the third party event 222, such as the third party status 226 of FIG. 2. For example, when the user would like to have flowers delivered to his wife after her arrival back from the business trip. The third party event 222 can include the arrival of the wife to her home. The information status module 716 can monitor the location of the wife, received as the third party status 226 by the sender 204. The information status module 716 can generate the sender status 224 using the received information 218 received and available at the first device 102 regarding location of the wife or any device belonging to her overlapping with an area identified or labeled in the information status module 716 as "home".

It has been discovered that communicating the conditional communication 202 based on the delivery condition 208 associated with the sender 204 provides increased safety and usability. The delivery condition 208 for the conditional communication 202 can control the transmission of the conditional communication 202. The distinction can ensure that the conditional communication 202 is created when the sender 204 is able to safely and conveniently use the communication system 100, but communicated when optimally convenient for the sender 204.

It has been discovered that determining the delivery condition 208 directly from or based on the content 210 within the conditional communication 202 can provide improved productivity for the user. The communication system 100 can suggest relevant information or the delivery condition 208 for the user based on the content 210 identified within the conditional communication 202. The distinction can ensure that the user can communicate the conditional communication 202 without needing to communicate the delivery condition 208 to the communication system 100.

It has further been discovered that determining the delivery condition 208 based on the received information 218 to the sender 204 can provide improved flexibility for the user. The sender 204 can identify the delivery condition 208 based on the received information 218, such as the result of the external event 220. The distinction can provide additional control for the sender 204 for the transmission of the conditional communication 202.

After determining the delivery condition 208 and the status 212, the control flow can pass to the comparison module 706. The control flow can pass similarly as described above between the communication module 702 and the condition block module 704, but using the determined values, such as the conditional communication 202, the delivery condition 208, the status 212, the sender status 224, or a combination thereof.

The comparison module is configured to compare the sender status 224 with the delivery condition 208. The comparison module 706 can compare the sender status 224 with the delivery condition 208 using the logical statement generated by the sender status module 710. The comparison module 706 can further compare the sender status 224 with the delivery condition 208 using the first control circuit 512, the second control circuit 534, or a combination thereof. The comparison module 706 can compare the delivery condition 208 with the sender status 224 based on the sender location 214, the time, the external event 220, the received information 218, or a combination thereof. The comparison module 706 can use predetermined time durations and distances based on user preferences for comparison. For example, when the delivery condition 208 includes the sender location 214, the sender status 224 can satisfy the delivery condition 208 when the sender location 214 within a certain distance from the actual calculated location. The distance can be specified by the user preference.

The comparison module 706 can generate the satisfaction status 228 of FIG. 2 for representing the sender 204 satisfying the delivery condition 208. The comparison module 706 can further include a satisfaction module 720 for generating the satisfaction status 228. The satisfaction module 720 is configured to generate the satisfaction status 228 based on the delivery condition 208.

The satisfaction module 720 can further generate the satisfaction status 228 for representing the sender 204 satisfying the delivery condition 208. The satisfaction module 720 can generate the satisfaction status 228 using the first control circuit 512, the second control circuit 534, or a combination thereof.

The satisfaction module 720 can further include a location satisfaction module 722, a time satisfaction module 724, and an information satisfaction module 726 for generating the satisfaction status 228. The satisfaction module 720 can use the sub-modules when the various input data matches the scenario as predetermined by the communication system 100. The satisfaction module 720 can use information from the location satisfaction module 722, the time satisfaction module 724, and the information satisfaction module 726 for determining the satisfaction status 228.

The location satisfaction module 722 is configured to generate the satisfaction status 228 based on comparison of the sender status 224 from the location status module 712 with the delivery condition 208. The location satisfaction module 722 can generate the satisfaction status 228 using the first control circuit 512, the second control circuit 534, or a combination thereof.

The time satisfaction module 724 is configured to generate the satisfaction status 228 based on comparison of the sender status 224 from the time status module 714 with the delivery condition 208. The time satisfaction module 724 can generate the satisfaction status 228 using the first control circuit 512, the second control circuit 534, or a combination thereof.

The information satisfaction module 726 is configured to generate the satisfaction status 228 based on comparison of the sender status 224 from the information status module 716 with the delivery condition 208. The information satisfaction module 726 can generate the satisfaction status 228 using the first control circuit 512, the second control circuit 534, or a combination thereof.

The information satisfaction module 726 can generate the satisfaction status 228 based on the sender status 224 from received information based on the external event 220. The information satisfaction module 726 can generate the satisfaction status 228 based on the sender status 224 satisfying the third party status 226. For example, when the delivery condition 208 is based on the third party event 222, such as the arrival of a friend to a restaurant, the information satisfaction module 726 would generate the satisfaction status 228 is unmet until the friend is within close proximity of the restaurant.

The information satisfaction module 726 can generate an alert, a flag, an audible tone, or a text message to notify the sender 204 of the satisfaction status 228. The information satisfaction module 726 can notify the sender 204 of the satisfaction status 228 using the first user interface 518, the first control interface 522, the first storage interface 524, the first display interface 530, the location interface 532, the second user interface 538, the second control interface 544, the second storage interface 548, the second communication interface 550, or a combination thereof.

It has been discovered that generating the satisfaction status 228 for representing the sender 204 satisfying the delivery condition 208 provides greater control for the user. The communication system 100 can alert the sender 204 to the generation of the satisfaction status 228. The sender 204 can be alerted to the satisfaction status 228 and asked for a final confirmation for the communication of the conditional communication 202. The distinction can ensure the sender 204 has the ability to cancel any unnecessary communication before they are communicated to the receiver 206.

It has further been discovered that generating the satisfaction status 228 based on the sender status 224 satisfying the third party status 226 tied to the sender 204 can provide added flexibility for the sender 204. The communication system 100 can receive the third party status 226 as information to the sender 204. The distinction can ensure that the sender 204 is notified of the third party status 226.

After determining the satisfaction status 228, the control flow can pass to the delivery module 708. The control flow can pass similarly as described above between the communication module 702 and the condition block module 704, but using the determined values, such as the conditional communication 202, the delivery condition 208, and the satisfaction status 228.

The delivery module 708 is configured to transmit the conditional communication 202 based on the delivery condition 208. The delivery module 708 can transmit the conditional communication 202 from the device for directly interfacing with the user or from a further device for interfacing with the device directly interfacing with the user.

The delivery module 708 can transmit the conditional communication 202 based on the satisfaction status 228 for communicating the conditional communication 202 to the receiver 206. The delivery module 708 can use the first device transmission 508 of FIG. 5, the second device transmission 510 of FIG. 5, the first control circuit 512, the first communication circuit 516, the second control circuit 534, the second communication circuit 536, the third device transmission 610 of FIG. 6, or a combination thereof to communicate the conditional communication 202 to the receiver 206.

For example, the conditional communication 202 can include the purchase of the online video to be watched during the trip. The transaction can be communicated to the video rental service once the sender 204 has started the trip. The delivery module 708 can receive the satisfaction status 228 from the comparison module 706 indicating that the sender 204 has met the delivery condition 208 and transmits the conditional communication 202 to the receiver 206.

Figure 8:
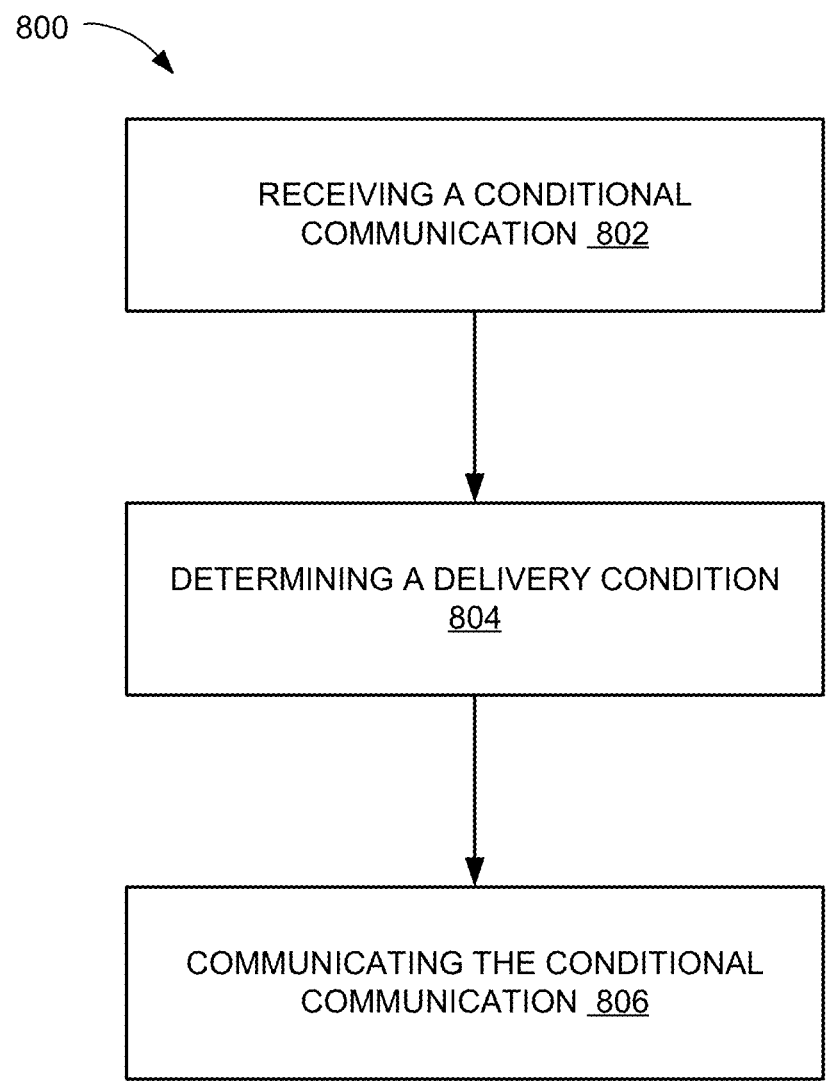
FIG. 8 is a flow chart of a method of operation of a communication device in an embodiment of the present invention.

Referring now to FIG. 8, therein is shown a flow chart of a method 800 of operation of a communication system 100 in an embodiment of the present invention. The method 800 includes: receiving a conditional communication for communicating the conditional communication from a sender to a receiver in a box 802; determining with a control circuit a delivery condition for communicating the conditional communication to the receiver based on the sender in a box 804; and communicating the conditional communication based on the delivery condition in a box 806.

The modules described in this application can be hardware implementation or hardware accelerators, including passive circuitry, active circuitry, or both, in the first storage circuit 514 of FIG. 5, the second storage circuit 546 of FIG. 5, the first control circuit 512 of FIG. 5, the second control circuit 534 of FIG. 5, or a combination thereof. The modules can also be hardware implementation or hardware accelerators, including passive circuitry, active circuitry, or both, within the first device 102 of FIG. 1, the second device 106 of FIG. 1, or a combination thereof but outside of the first storage circuit 514, the second storage circuit 546, the first control circuit 512, the second control circuit 534, or a combination thereof.

The communication system 100 has been described with module functions or order as an example. The communication system 100 can partition the modules differently or order the modules differently. For example, the communication system 100 can implement the sender status module 710 and the satisfaction module 720 as main modules instead of sub-modules. Also for example, the conditional communication 202 from the communication module 702 can flow to the delivery module 708 directly.

For illustrative purposes, the various modules have been described as being specific to the first device 102 or the second device 106. However, it is understood that the modules can be distributed differently. For example, the various modules can be implemented in a different device, or the functionalities of the modules can be distributed across multiple devices. Also as an example, the various modules can be stored in a non-transitory memory medium.

As a more specific example, one or more modules described above can be stored in the non-transitory memory medium for distribution to a different system, a different device, a different user, or a combination thereof, for manufacturing, or a combination thereof. Also as a more specific example, the modules described above can be implemented or stored using a single hardware unit or circuit, such as a chip or a processor, or across multiple hardware units or circuits.

The modules described in this application can be stored in the non-transitory computer readable medium. The first storage circuit 514, the second storage circuit 546, or a combination thereof can represent the non-transitory computer readable medium. The first storage circuit 514, the second storage circuit 546, or a combination thereof, or a portion therein can be removable from the first device 102, the second device 106, or a combination thereof. Examples of the non-transitory computer readable medium can be a non-volatile memory card or stick, an external hard disk drive, a tape cassette, or an optical disk.

The physical transformation of the delivery condition 208 of FIG. 2 required to be met by the sender 204 of FIG. 2 results in the movement in the physical world, such as for the conditional communication 202 of FIG. 2 displayed or recreated for the user on one or more of the devices. Movement in the physical world results in updates to the sender status 224 of FIG. 2 which can be fed back into the communication system 100 and further influence the satisfaction status 228 of FIG. 2, the conditional communication 202, or a combination thereof required for communicating the conditional communication 202 or the content 210 of FIG. 2 therein to the receiver 206 of FIG. 2.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of an embodiment of the present invention is that it valuably supports and services the historical trend of reducing costs, simplifying systems, and increasing performance.

These and other valuable aspects of an embodiment of the present invention consequently further the state of the technology to at least the next level.

While the invention has been described in conjunction with a specific best mode, it is to be understood that many alternatives, modifications, and variations will be apparent to those skilled in the art in light of the foregoing description. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:

1. A method of operation for a communication system comprising: receiving, with a communication module, a conditional communication for communicating the conditional communication from a sender to a receiver; placing the conditional communication into a message escrow account for transmitting the conditional communication at a later time pending satisfaction of conditions determined by a sender; determining, with a control circuit, a delivery condition for communicating the conditional communication to the receiver based on the senders location relative to the receivers location identifying key words or phrases in the conditional communication, and using a present instance and a past instance of the conditional communication wherein the delivery condition is generated by the receiver; and communicating, with a delivery module, the conditional communication based on the delivery condition; wherein determining the delivery condition includes: generating a third party status for representing a status of a third party event relative to the sender; and determining the delivery condition based on the third party status for communicating the conditional communication based on the sender relative to the third party event; generating a satisfaction status for representing the sender satisfying the delivery condition; wherein: communicating the conditional communication includes communicating the conditional communication based on the satisfaction status for communicating the conditional communication to the receiver; and determining the delivery condition includes determining the delivery condition for requiring the sender to satisfy the delivery condition in communicating the conditional communication to the receiver; identifying a sender status for representing the sender associated with a third party event; wherein determining the delivery condition includes: receiving the conditional communication including a third party status for representing the third party event associated with the sender for communicating the conditional communication; and generating the satisfaction status includes generating the satisfaction status based on the sender status satisfying the third party status.

2. The method as claimed in claim 1 wherein determining the delivery condition includes determining the delivery condition based on a delayed-delivery time, a sender status, a received information, or combination thereof for representing the sender.

3. The method as claimed in claim 1 wherein determining the delivery condition includes: identifying a scenario based on the conditional communication; and determining the delivery condition based on the scenario of the conditional communication.

4. The method as claimed in claim 1 wherein determining the delivery condition includes: generating an external event for communicating the conditional communication; and determining the delivery condition based on the external event.

5. The method as claimed in claim 1 wherein determining the delivery condition includes: receiving the conditional communication including a content without the delivery condition for communicating the content generated by the sender; and generating the delivery condition based on the content.

6. The method as claimed in claim 1 wherein determining the delivery condition includes determining the delivery condition based on a delayed-delivery time, a sender status, a received information, or combination thereof for representing the sender or the received information at the sender corresponding to the delayed-delivery time, the sender status, or a combination thereof associated with the third party event.

7. The method as claimed in claim 1 wherein communicating the conditional communication includes communicating the conditional communication from a device for directly interfacing with the user or from a further device for interfacing with the device directly interfacing with the user.

8. A communication system comprising: a control circuit configured to: receive a conditional communication for communicating the conditional communication from a sender to a receiver; place the conditional communication into a message escrow account for transmitting the conditional communication at a later time pending satisfaction of conditions determined by a sender; determine a delivery condition for requiring the sender to satisfy the delivery condition in communicating the conditional communication to the receiver based on the sender's location relative to the receiver's locations identifying key words or phrases in the conditional communication, and using a present instance and a past instance of the conditional communication wherein the delivery condition is generated by the receiver; communicate the conditional communication based on the delivery condition; and a storage circuit, coupled to the control circuit, configured to store the conditional communication; wherein the control circuit is configured to: generate a third party status for representing a status of a third party event relative to the sender; and determine the delivery condition based on the third party status for communicating the conditional communication based on the sender relative to the third party event; generating a satisfaction status for representing the sender satisfying the delivery condition; wherein: communicating the conditional communication includes communicating the conditional communication based on the satisfaction status for communicating the conditional communication to the receiver; and determining the delivery condition includes determining the delivery condition for requiring the sender to satisfy the delivery condition in communicating the conditional communication to the receiver; identifying a sender status for representing the sender associated with a third party event; wherein determining the delivery condition includes: receiving the conditional communication including a third party status for representing the third party event associated with the sender for communicating the conditional communication; and generating the satisfaction status includes generating the satisfaction status based on the sender status satisfying the third party status.

9. The system as claimed in claim 8 wherein the control circuit is configured to determine the delivery condition includes determining the delivery condition based on a delayed-delivery time, a sender status, a received information, or combination thereof for representing the sender.

10. The system as claimed in claim 8 wherein the control circuit is configured to: identify a scenario based on the conditional communication for determining the delivery condition; and determine the delivery condition based on the scenario of the conditional communication.

11. The system as claimed in claim 8 wherein the control circuit is configured to: generate an external event for communicating the conditional communication; and determine the delivery condition based on the external event.

12. A non-transitory computer readable medium including instructions executable by a control circuit for a communication system, the instructions comprising: receiving a conditional communication for communicating the conditional communication from a sender to a receiver; placing the conditional communication into a message escrow account for transmitting the conditional communication at a later time pending satisfaction of conditions determined by a sender; determining a delivery condition for communicating the conditional communication to the receiver based on the sender's location relative to the receiver's location identifying key words or phrases in the conditional communication, and using a present instance and a past instance of the conditional communication wherein the delivery condition is generated by the receiver; and communicating the conditional communication based on the delivery condition; wherein determining the delivery condition includes: generating a third party status for representing a status of a third party event relative to the sender; and determining the delivery condition based on the third party status for communicating the conditional communication based on the sender relative to the third party event; generating a satisfaction status for representing the sender satisfying the delivery condition; wherein: communicating the conditional communication includes communicating the conditional communication based on the satisfaction status for communicating the conditional communication to the receiver; and determining the delivery condition includes determining the delivery condition for requiring the sender to satisfy the delivery condition in communicating the conditional communication to the receiver; identifying a sender status for representing the sender associated with a third party event; wherein determining the delivery condition includes: receiving the conditional communication including a third party status for representing the third party event associated with the sender for communicating the conditional communication; and generating the satisfaction status includes generating the satisfaction status based on the sender status satisfying the third party status.

13. The non-transitory computer readable medium as claimed in claim 12 wherein determining the delivery condition includes determining the delivery condition based on a delayed-delivery time, a sender status, a received information, or combination thereof for representing the sender.

14. The non-transitory computer readable medium as claimed in claim 12 wherein determining the delivery condition includes: identifying a scenario based on the conditional communication; and determining the delivery condition based on the scenario of the conditional communication.

15. The non-transitory computer readable medium as claimed in claim 12 wherein determining the delivery condition includes: generating an external event for communicating the conditional communication; and determining the delivery condition based on the external event.

* * * * *